United States Patent

[11] 3,609,529

| [72] | Inventors | John Skubiak<br>Oakland County, Mich.;<br>John A. Toth, Cuyahoga County, Ohio |
|---|---|---|
| [21] | Appl. No. | 793,807 |
| [22] | Filed | Jan. 24, 1969 |
| [45] | Patented | Sept. 28, 1971 |
| [73] | Assignee | Republic Steel Corporation<br>Cleveland, Ohio |

[54] METHOD AND APPARATUS FOR DETECTING DEFECTS IN ARTICLES MOVING ALONG A PATH OF TRAVEL
23 Claims, 11 Drawing Figs.

| [52] | U.S. Cl. | 324/37 |
|---|---|---|
| [51] | Int. Cl. | G01r 33/12 |
| [50] | Field of Search | 324/34, 37, 38; 73/67.5–67.9 |

[56] References Cited
UNITED STATES PATENTS

| 3,244,972 | 4/1966 | Fisher | 324/37 |
| 3,299,349 | 1/1967 | Tompkins et al. | 324/37 |
| 3,299,350 | 1/1967 | Tompkins et al. | 324/37 |
| 3,311,819 | 3/1967 | Miller | 324/37 |
| 3,336,527 | 8/1967 | Paulson et al. | 324/40 |
| 3,371,524 | 3/1968 | Wloszek | 73/67.8 |
| 3,411,075 | 11/1968 | Kahoun | 324/34 |

*Primary Examiner*—Rudolph V. Rolinec
*Assistant Examiner*—R. J. Corcoran
*Attorneys*—Robert P. Wright and Joseph W. Malleck

ABSTRACT: Apparatus for electrically detecting and marking defects in metal articles includes inspection devices for orbiting about a moving article to detect flaws in the article, a logic unit associated with the inspection devices for processing inspection information provided by the devices, and a marker unit operated by output signals from the logic unit to mark the locations of the flaws.

The disclosed apparatus also includes a calibration device for quick and simple calibration of the inspection devices.

INVENTORS
JOHN SKUBIAK
JOHN A. TOTH
BY Watts, Hoffmann,
Fisher & Heinke
ATTORNEYS.

INVENTORS
JOHN SKUBIAK
JOHN A. TOTH
BY Watts, Hoffmann,
Fisher & Heinke
ATTORNEYS INVENTORS.
JOHN SKUBIAK
JOHN A. TOTH
BY Watts, Hoffmann,
Fisher & Heinke
ATTORNEYS.

METHOD AND APPARATUS FOR DETECTING DEFECTS IN ARTICLES MOVING ALONG A PATH OF TRAVEL

CROSS-REFERENCED PATENTS AND PATENT APPLICATIONS

U.S. Pat. No. 2,660,704, entitled "Seam Depth Indicator," issued Nov. 24, 1953, to W. C. Harmon et al.

U.S. Pat. No. 3,263,809, entitled "Apparatus For Defect Analysis And Classification Of Workpieces," issued Aug. 2, 1966, to Mandula and Judd.

Copending application Ser. No. 365,130, filed May 5, 1964, entitled "Apparatus And Method For Inspecting And Propelling Elongated Workpieces."

Copending application Ser. No. 751,465 filed Aug. 9, 1968, entitled "Method and Apparatus For Straightening And Testing Workpieces."

Copending application Ser. No. 789,159 filed Jan. 6, 1969 by J. Vild, entitled "Logic Circuit For Defect Detecting And Marking Apparatus."

BACKGROUND OF THE INVENTION

1. Field of the Invention

The present invention relates to flaw inspection of articles of manufacture and more particularly relates to high-speed inspection and marking defects in metal articles such as large diameter pipe with eddy current detection techniques.

2. Prior Art

Articles of manufacture, such as steel bars and pipe, have, in the past, been inspected by apparatuses each of which induces a flow of electricity in a workpiece being inspected.

With such apparatus a flaw detection probe is moved along a surface of the workpiece. The probe includes a detection coil. Flaws in the workpiece, such as seams and cracks, cause discontinuities in the flow of current in the workpiece. These discontinuities in current flow affect the electrical impedance of the detection coil. Changes in coil impedance produce output signals which indicate the presence of flaws. The magnitude of a change in the probe coil impedance, and therefore the magnitude of the output signal, is proportional to the severity of the flaw.

In addition to indicating the presence of flaws, the systems described in the referenced patents and applications have used detection coil output signals to:

1. trigger workpiece marking devices which automatically mark the location of a detected flaw;
2. indicate the extent and severity of the flaw; and,
3. provide input signals to classification mechanisms which sort workpieces into acceptable, repairable and scrap groupings.

In one system disclosed in the references, a bar is propelled along a path of travel and simultaneously rotated about its axis. A stationary defect detecting apparatus scans a helical path along the workpiece. While this and other prior systems have been outstanding for their intended purposes, they have limitations both as to the size and quantity of workpieces which can be inspected.

As an example, welded and seamless pipe can be produced in large diameters at high linear pipe speeds of, for example, 200 feet per minute. Prior inspection devices are incapable of completely inspecting such large pipe at these production speeds.

Some prior proposals have attempted to cope with the problems of inspecting large pipes by rotating defect detecting devices about the pipe. These proposals have not been fully satisfactory. In the main they have not had the adjustability and flexibility for use in quantity production of pipes of various diameters. Further they have not had the capability of completely inspecting a large diameter pipe at the speed with which it is produced.

Furthermore, prior proposals for rotating detectors have not been effective to mark the locations of detected flaws and have been difficult to calibrate and service.

SUMMARY OF THE INVENTION

The present invention provides a method and apparatus for inspecting and marking defects in articles. With this invention a plurality of inspection heads are orbited about an article in the form of a workpiece as it advances along a path of travel. A logic unit is connected to the inspection heads. The logic unit processes defect information provided by the heads and controls a marker unit which marks the locations of detected defects.

The inspection heads and marker unit are mounted on a drive assembly. This drive assembly is carried by a support frame. The support frame and the mechanisms it causes are movably mounted on a bed. The support frame is movable horizontally from a test position along the path of travel to a calibration position to one side of the path. When the support frame is in the calibration position, articles may continue advancing along the path while the inspection unit is being calibrated or serviced.

The inspection heads and marker units surround the path of travel of the articles being inspected when the support frame is in the test position. The support frame is adjustable vertically on the bed. This permits the drive assembly and the supported inspection and marker units to be positioned concentrically about articles of various diameters.

Each head includes a probe coil and a wearshoe which rides upon the periphery of a product being inspected. Each coil is electrically connected to the logic unit and produces defect signals for indicating the location, severity and extent of flaws in the product.

The apparatus includes an adjusting structure permitting the inspection heads to be adjusted radially with respect to the path of travel. This radial adjustment permits workpieces having various diameters to be inspected accurately and completely after a quick and simple adjustment of the heads to bring the wearshoes into contact with a workpiece. As a workpiece advances along its path of travel, the drive assembly rotates about the axis of the workpiece. With this rotation and advancing, the path of each head relative to the workpiece is helical.

Each head inspects a helical path on the periphery of the workpiece. The number of heads, the speed of rotation and the speed of workpieces travel and are connected so that, for the first time, the entire surface of a large diameter pipe is inspected at the speed at which the pipe is made.

The marker unit includes a plurality of marker devices positioned at spaced locations about the path of travel. The markers are radially adjustable relative to the path of travel to accommodate articles of different diameters. A novel drive is provided for simultaneously adjusting the marker devices.

The marker devices are individually controlled by the logic unit so that the location of each detected flaw is accurately marked, in response to inspection information provided by the inspection heads. The marker devices are in the form of paint spraying guns each of which sprays paint over a given segment of the product periphery in which a flaw is detected.

The inspection unit is quickly and easily calibrated. The support frame carries a simulated article containing a number of flaws of known severity. The simulated article is hinged to the support frame so that it can be inserted into an inspecting station defined by the inspection unit. When the simulated article is properly positioned, the head support assembly is rotated so that the heads orbit about the simulated article. Each head passes the flaws in the simulated article and the response of individual heads to the flaws in the simulated article is determined so that the heads can be calibrated.

The marker unit is movable with respect to the inspection unit about a hinge between the marker unit and the support frame. Thus the marker unit is swung away from the inspection unit when the simulated article is inserted. This construction also permits ready accessibility of the inspection unit for maintenance.

Accordingly a principal object of the present invention is the provision of a new and improved method and apparatus advancing along a path of travel wherein substantially the entire peripheral wall of the product is inspected for flaws and the flaws appropriately marked as the product is nonrotatably advanced at relatively high speeds; wherein articles of various dimensions are easily and quickly accommodated; and which permits efficient maintenance and calibration of the inspection apparatus.

Other objects and advantages of the present invention will become apparent from a consideration of the following detailed description thereof made with reference to the accompanying drawings which form a part of the specification.

DESCRIPTION OF A PREFERRED EMBODIMENT

Figure 1:
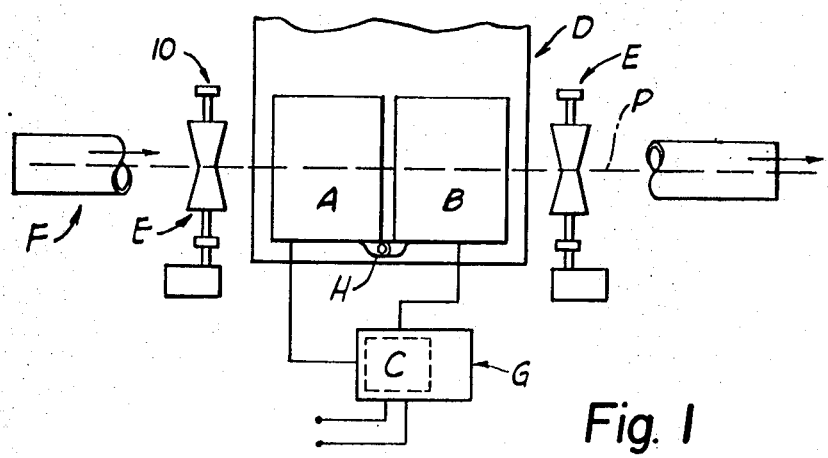
FIG. 1 is a schematic plan view of novel and improved apparatus for inspecting and marking defects in articles.

Apparatus 10 for detecting and marking flaws in articles of manufacture is illustrated in FIG. 1. The apparatus 10 comprises an inspection unit A, a marker unit B, a logic unit C and a support structure D for the inspection and marker units. Conveyors E, only two of which are shown, are positioned at opposite ends of the apparatus for conveying articles of manufacture F along the path of travel P through the inspection and marker units A, B.

The apparatus 10 is illustrated and described in connection with the manufacture of pipe and accordingly the article F is in the form of a ferrous pipe. Successive lengths of pipe are conveyed along the path of travel P by the conveyor units E and the path of travel, as referred to in this description, is along the axis of the pipe F.

The inspection unit A surrounds the pipe F. The unit includes flaw detecting heads for providing electrical signals to the logic unit C when flaws are detected. The marker unit B also surrounds the pipe F and includes a plurality of marking devices. The marking devices respond individually to signals from the logic unit to mark the flaws detected by the inspection unit A.

Figure 2:
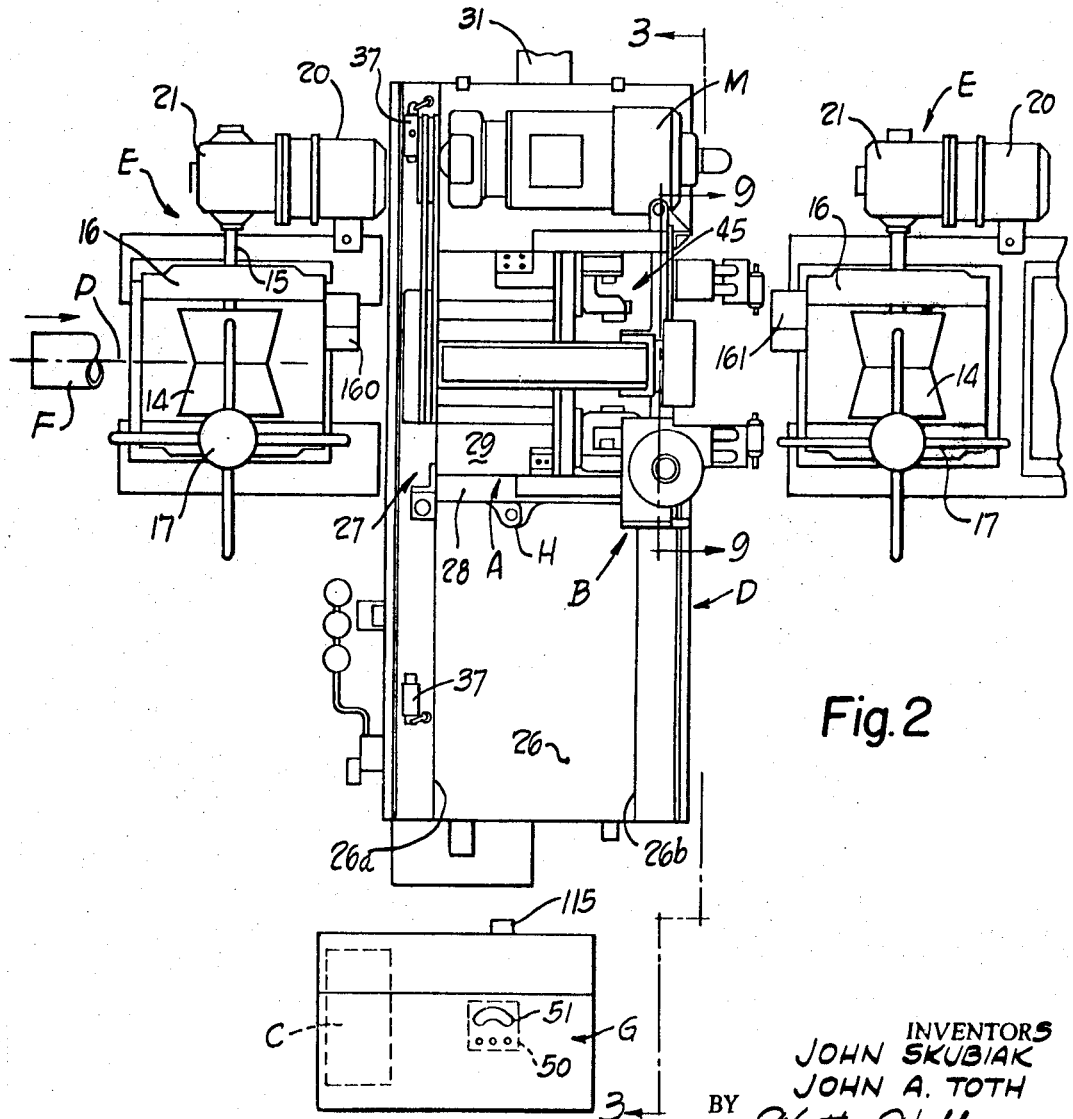
FIG. 2 is an enlarged plan view of apparatus embodying the present invention similar to FIG. 1 with certain parts shown in more detail.

Operation of the apparatus 10 is controlled from a control panel G adjacent the apparatus, FIG. 2. The logic unit C is housed in the control panel G and is preferably constructed as disclosed in copending U.S. Pat. application to Vild referenced above to which reference is made for details of operation of the logic unit.

Figure 3:
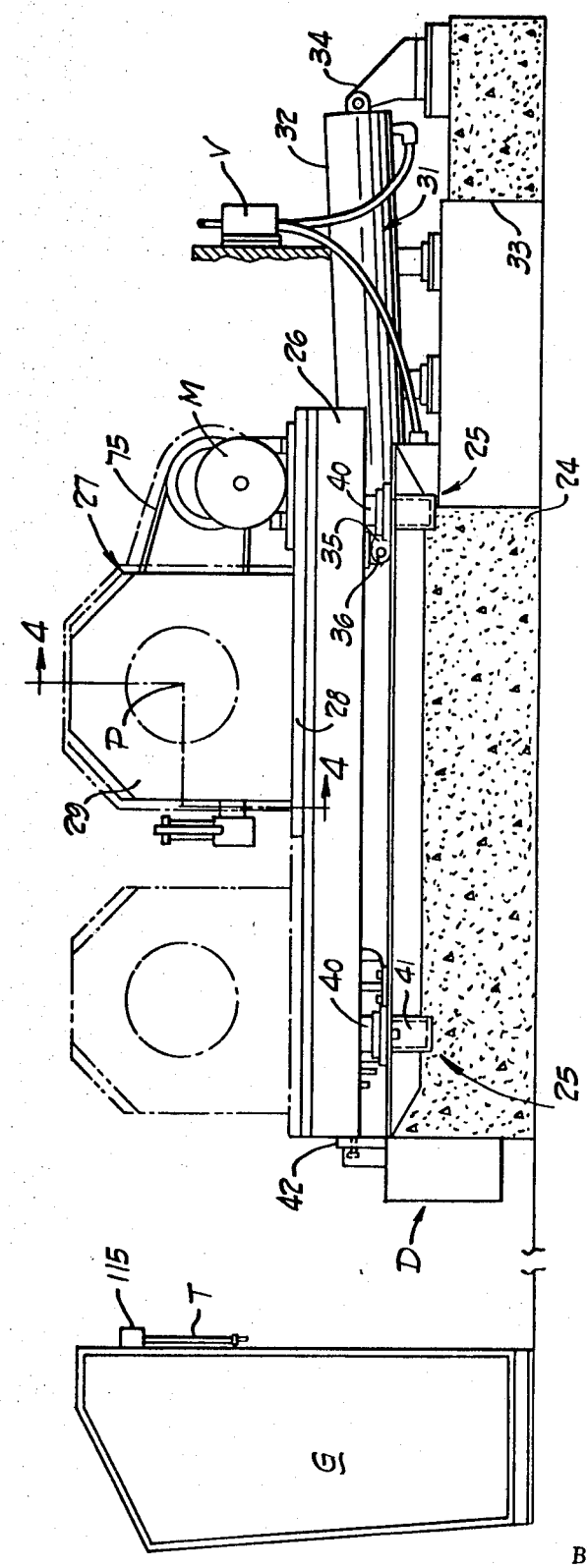
FIG. 3 is a cross-sectional view as seen from the plane indicated by the lines 3—3 of FIG. 2 and having portions illustrated schematically.

REferring to FIGS. 2 and 3, the conveyors E are illustrated as conventionally constructed "pinch rolls" for rigidly maintaining the pipe on the path of travel through the apparatus. Each conveyor includes a roll 14 fixed to a shaft 15 and positioned between a pair of supports 16, 17. Each shaft is journaled in the supports 16, 17 and driven by an electric motor 20 through a suitable drive transmission 21.

The inspection and marker units A, B are positioned on the support structure D. The support structure D includes a slab 24 supporting four jack assemblies 25, FIG. 3. A bed 26 is fixed to the jack assemblies and a support frame 27 is supported on the bed 26. The support frame 27 includes a platelike table 28 disposed on the bed 26. An inspection flatways for the unit A is attached to the table 28 and forms a part of the support frame 27.

The support frame 27 and units A, B form an inspection assembly. The assembly is movable horizontally between the inspection position shown in solid lines in FIG. 3, and a calibration and servicing position shown in phantom. Movement of the inspection assembly is along V and flatways 26a, 26b on the bed 26. The ways 26a, 26b cooperate with a V slot 30a and a flat 30b on the table 28, FIG. 4.

In the inspection position the support frame 27 and units A, B are positioned along the path of travel P so that the pipe F passes through the units A, B for inspection and marking. In the calibration and servicing position the entire inspection assembly is cleared from the path of travel. Movement of the assembly out of the path of travel facilitates calibration and maintenance of the units A, B and permits continued movement of pipes along the conveyors. k An actuator 31 is provided to shift the inspection assembly from one position to the other, FIG. 3. The actuator 31 is of a double-acting hydraulic cylinder. The actuator 31 includes a cylindrical housing 32 anchored to a slab 33 by a clevice joint 34. The actuator 31 has a piston rod 35 connected to the table 28 by a clevice joint 36. Operation of the actuator 31 is controlled by a solenoid valve V located near the actuator. The valve V is connected to and controlled by circuitry in the control panel G. The extent of movement of inspection assembly by the actuator 31 is controlled by limit switches 37 which are disposed on the bed 26. Thus, when the inspection assembly reaches either its inspection or its calibration position operation of the actuator is terminated in response to a signal from one of the limit switches.

To facilitate calibration and maintenance the marker unit B can be moved away from the unit A. In the preferred construction the marker unit is connected to the housing 29 by a hinge H which permits the marker unit to swing away from the inspection unit. Due to this construction the interior of each unit is easily accessible, particularly for calibration purposes as is described in greater detail presently.

The inspection assembly is vertically movable by the jack assemblies 25. This vertical adjustment permits the inspection and marking devices to be positioned conventionally about a workpiece of any diameter falling within the range of sizes that can be inspected by the apparatus.

The base frame 26 is, as seen in the plane, generally rectangular. One jack assembly 25 is disposed at each corner of the bed. Each jack assembly 25 includes a screwjack 40. All screwjacks 40 are driven by an electric motor 41 through appropriate shafts and gearing. The motor 41 is controlled from the panel G.

Preferably the bed 26 is provided with suitable indicia bearing structure for relating the height of the bed 26 to the diameter pipe to be conveyed through the apparatus. This structure is shown schematically at 42 in FIG. 3. In the preferred embodiment operation of the jack motors is also automatically controlled by circuitry in the control panel so that the proper bed elevation is automatically obtainable.

THE INSPECTION UNIT A

Figure 4:
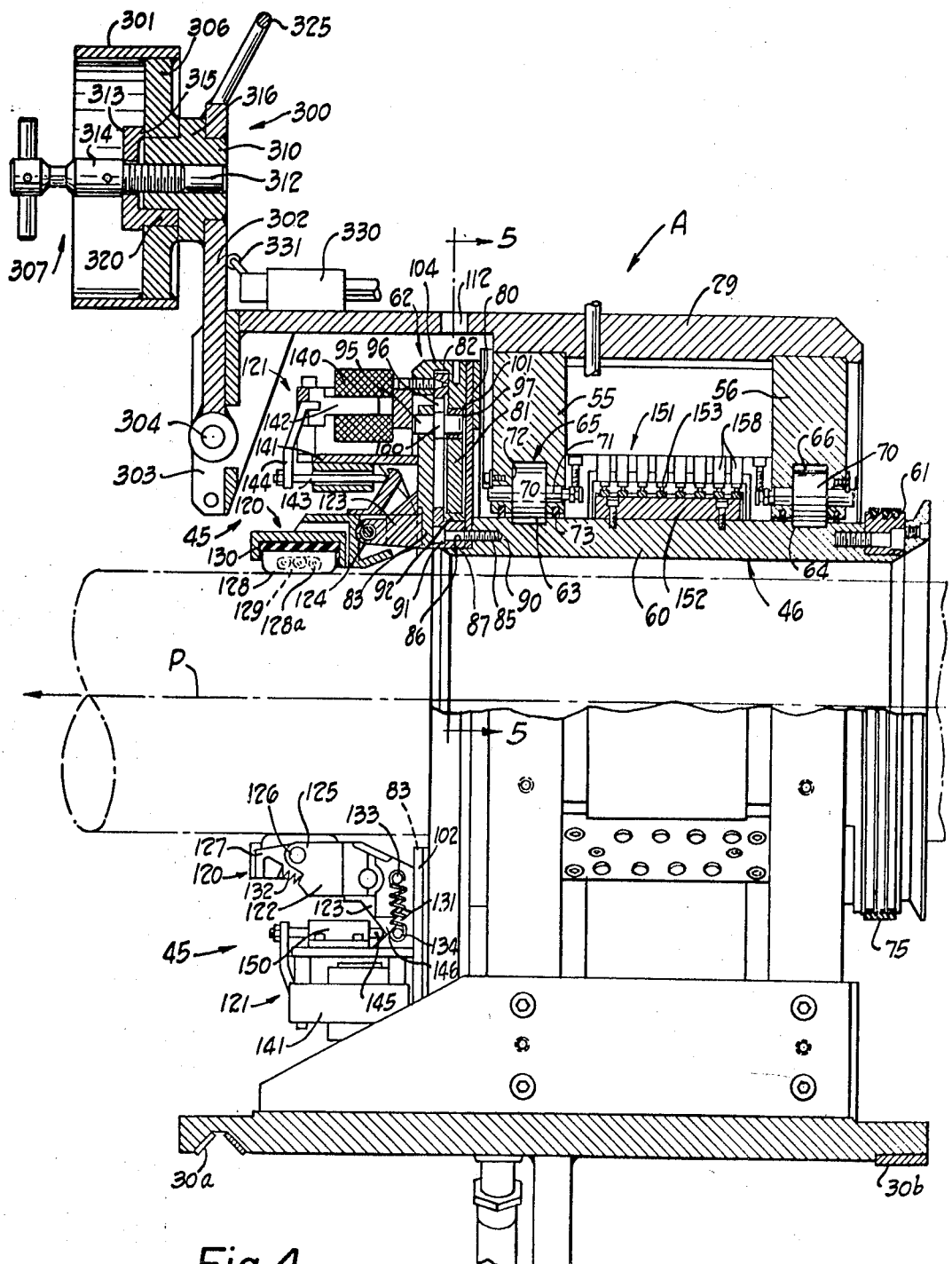
FIG. 4 is a cross-sectional view of an inspection unit of the apparatus of FIG. 3 as seen from the planes indicated by the line 4—4 of FIG. 3.

The inspection unit A comprises four inspection heads 45 only two of which are illustrated in FIG. 4. The heads 45 are connected to a rotatable support assembly 46. The support assembly 46 is mounted in the housing 29 and surrounds the path of travel of the pipe. The assembly 46 is driven by a motor M FIGS. 2 and 3. This rotation causes the inspection heads to orbit about the pipe advancing through the unit.

The inspection housing 29 includes spaced, annular, bearing supports 55, 56. The supports extend about the interior of the inspection housing. Each bearing support has a central opening through which the support assembly 46 extends.

The support assembly 46 is journaled in the bearing supports 55, 56 by bearings 65,66. The support assembly is a tubular body 60. A drive pulley assembly 61 is secured to one end of the body 60 and an inspection head support structure 62 is secured to the other. The periphery of the body 60 is provided with bearing grooves 63, 64 while receiving the bearings 65, 66.

The bearings each include a roller 70 rotatably disposed on shafts 71. The shafts are carried by the bearing supports. Each roller 70 is received in a recess 72 in the bearing support. Sealing rings 73 extend between the bearing supports and body 60 at each side of the rollers 70 to maintain lubricant in the bearings.

A motor M is mounted on the table 28. The drive pulley assembly 61 is external out of the inspection housing 29. A belt drive 75 is trained around the assembly 61 and a pulley on the shaft on the motor M.

The motor M is variable speed in order that the speed of rotation may be adjusted. A conventional motor speed control and a tachometer 50, 51 FIG. 2, are provided in the control panel G so that the speed of the motor can be monitored and adjusted.

The support structure 62 supports the inspection heads 45 to the body 60. The heads are radially adjustable on the structure 62. To accomplish this adjustment and support, the support structure 62 includes three annular plates 80, 81, 82 and four slides 83. The slides 83 are at 90° intervals and each supports one of the heads 45.

The plates 80–82 are denominated mounting, cam and guide plates, respectively. The mounting plate 80 is fixed to the body 60 by capscrews 85 which extend through holes 86, 87, a spacer ring 91 and mounting plate respectively. The capscrews 85 thread into a tapped hole 90 in the body 60. The guide plate is suitably secured to the spacers 86. A bushing 92 is interposed between the spacer 91 and the cam plate 81 so that the cam plate 81 is free to rotate with respect to the plates 80, 82.

The slides 83 are each supported by the guide plate 82 and the cam plate 81 for radial adjustment. As seen in FIG. 4, the slides 83 each include a projecting pin 95. Each pin 95 extends through an associated radial guide slot 96 in the plate 82 and a cam slot 97 in the cam plate 81. Each pin 95 includes a shoulder 100 slidably disposed in its guide slot 96. A bushing 101 is around each pin and in an associated one of the cam slots 97.

Figure 5:
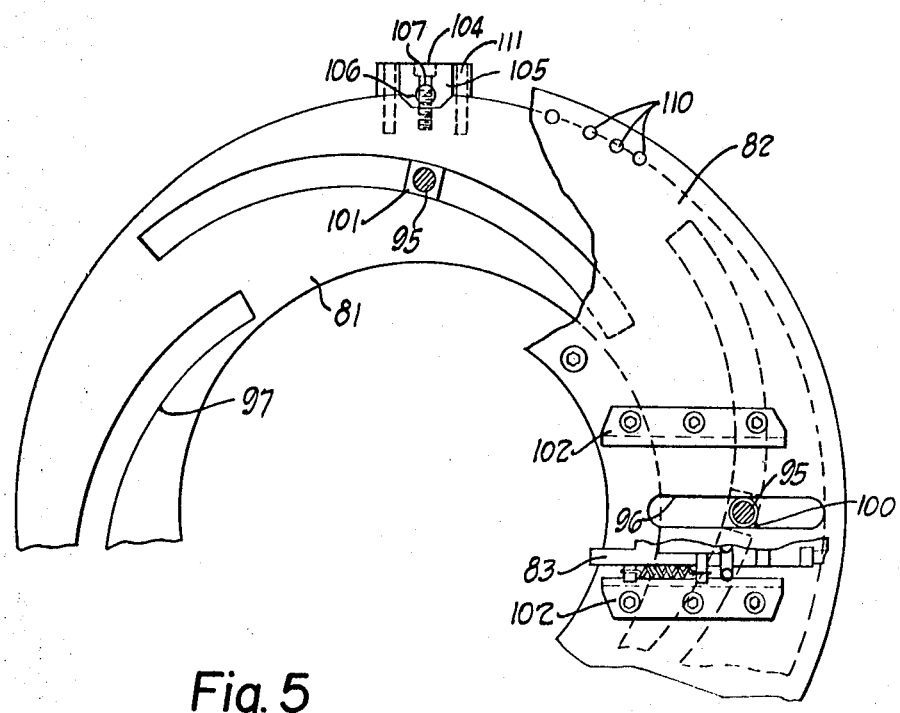
FIG. 5 is an enlarged fragmentary view seen from the plane indicated by the line 5—5 of FIG. 4, with portions broken away and removed.

The slides 83 are radially moved to adjust the heads 45 for a given pipe size by rotating the plates 81, 82 relative to each other. As seen in FIG. 5 the cam slots 97 are generally arcuate and extend spirally of the plate 81. Each cam slot extends through a cam plate arc of approximately 90°. These cam slots, as shown, are transverse to the radially disposed guide slots 96 and hence the cam plate supports the slides against radial movement. When the cam plate 81 is rotated relative to the guide plate 82 each bushing 101 follows its associated cam slot 97, and the slides 83 are moved radially toward and away from the axis of the plate 82 in the guide slots 96. Guides 102 are attached to each of the guide plate 82 for engaging the slides 83 and preventing the slides from rotating about the pins 95.

The plates 81, 82 are locked together in predetermined positions during inspection by a locking assembly 104. The locking assembly 104 includes a projection 105 extending from the periphery of the cam plate 81 around the outer periphery of the support plate 82 and radially inwardly along the plate 82 a short distance. A cam lock screw 106 extends through a tapped hole 107 in the finger 105 and into an aligned one of a series of blind holes 110 in the guide plate 82. The holes 110 are spaced apart about the guide plate to provide a series of orientations at which the plates 81, 82 are locked together for inspection of various standard pipe sizes.

The slides are adjusted manually by an operator of the apparatus. As previously mentioned the units A, B are connected by the hinge H. The unit B is swung away from the inspection unit about the hinge H to expose the heads 45 and plate 82 to the operator. The operator then loosens the cam lock screw 106 and turns the cam plate 81 relative to the support plate 82 by use of a hand tool. The hand tool is inserted into bores 111 in the finger 105. The bores are accessible through a slot 112 (FIG. 4) in the inspection housing 29. The slot 112 is of sufficient arcuate extent to permit the cam plate to be rotated through a substantial angle about its axis.

The slides are adjusted radially to a desired location by rotating the cam plate until a predetermined one of the holes 110 in the guide plate is aligned with the setscrew 106 and the hole 107. The holes 110 are suitably marked to indicate the pipe size to which each corresponds. When the appropriate one of the holes 110 is aligned with the hole 107, the screw is tightened thus locking the slides 83 in position.

The inspection unit is constructed so that it is extremely unlikely that the inspection heads can be orbited with an adjusting tool inadvertently left in the cam plate 81 which might otherwise damage the inspection unit position or injure nearby personnel. To this end a tool T (FIGS. 3 and 6), constructed specifically for insertion through the slot 112 and into the bores 111 is provided. While it may not be impossible to adjust the cam plate 81 with other tools, it is sufficiently difficult to insure consistent use of the tool T for this purpose.

A support 115 is provided on the control panel to receive the tool T when it is not in use. The support 115 is provided with an electrical switch 116 (FIG. 6) connected in series between the motor M and a power supply terminal for the motor. The illustrated switch 116 includes conductors 116a, 116b in the motor energizing circuit which are electrically connected by a movable contact arm 116c. The switch arm 116a is closed on the conductors 116a, 116b by the tool T only when the tool is properly positioned in its support 115. At all other times the switch is open to interrupt the energizing circuit for the motor M. Hence the motor M cannot be energized to orbit the inspection heads if the tool T is inadvertently left in engagement with the cam plate 81 subsequent to adjustment of the heads.

The support 115 and switch 116 may be of any suitable construction and are therefore shown schematically. Furthermore, it should be pointed out that the tool T itself may be constructed so as to include a part forming a portion of a conductive path controlling energization of the motor. Additionally, the tool T or switch 116 may form part of a low voltage circuit for controlling the energization circuit to the motor M.

THE INSPECTION HEADS

The inspection heads are substantially identical and each is identically mounted upon a slide 83. Accordingly, only one head 45 and its mode of connection to a slide is described in detail in reference to FIG. 4.

The head 45 includes a probe coil assembly 120 and an actuator 121 for operating the coil assembly between an inspection position and retracted, nonoperating position. The coil assembly 120 includes a body 122 and arms 123. The body 122 is pivotally mounted on the arms 123 by a pintle 124. The arms 123 are fixed on the slide. The body 122 has projecting ends in the form of ears 125. The ears 125 support trunnions 126 which are secured to a rectangular cup 127. A coil unit 128 is housed in the cup 127. The coil unit includes a small probe coil 129 which is disposed in a wearshoe 128a.

In the inspection position of the assembly 120, the coil unit 128 rides on the periphery of a workpiece. The coil is constructed to maintain contact with the pipe or other workpiece regardless of normal irregularities in the pipe surface.

The cup 127 rotates about the axis of the trunnions 126 in accommodating surface irregularities of the pipe. A resiliently compressible foam rubber pad 130, disposed between the coil unit 128 and the cup, permits limited substantially universal movement of the unit 128 in the cup.

The unit 128 is resiliently biased against the pipe by springs 131, 132 when the assembly 120 is in the inspection position. The springs 131 are disposed at opposite sides of the body 122 for urging the body and the unit 128 toward the pipe. Each spring 131 is connected in tension between a pin 133 on the body 122 and a pin 134 fixed to the slide 83, FIG. 4. Hence these springs act together to urge the body 122 about the pintle 124 to bias the unit 128 into engagement with the pipe.

The spring 132 serves primarily to protect the assembly 120 from structural damage when a pipe strikes the unit 128. The springs 132 is lightly compressed between the body 122 and the cup 127 to exert a tipping force on the cup. This tipping force urges the downstream or trailing portion of the unit 128, in the direction of travel of the pipe, toward the path of travel. Should the leading end of a pipe strike the unit 128, the pipe merely urges the unit 128 about the trunnions 126 and against the spring 132 thus avoiding structural damage to the probe assembly. Normally the assembly 120 is in the retracted position when the leading level of the pipe advances through the unit A as is described presently, but the spring insures against damage to the units 128 in the event of malfunction of an actuator 121, or in the event of a unit 128 being forced temporarily out of pipe contact by an irregularity or by foreign matter. The actuator 121 controls movement of the probe assembly 120 between the inspection and retracted positions. The illustrated actuator 121 includes a solenoid coil 140 and mounting bracket 141, an armature 142, and a push rod 143 connected to the armature by an arm 144. When the solenoid 140 is energized the armature 142 is pulled in causing the push rod 143 to rotate the probe assembly 120 to the retracted position noted above. The end 145 of the push rod bears on a cam lobe 146 formed on the body 122. A guide 150 attached to the bracket 141 maintains the push rod aligned with the lobe 146. When the solenoid 140 is deenergized the assembly 120 is moved into the inspection position by the springs 131 which also serve to move the armature 142 back out of the solenoid.

The probe coils and solenoids are electrically connected to the appropriate control circuitry in the control panel G through a slipring assembly 151. The slipring assembly 151 is disposed between the bearing supports 55, 56 and includes a ring supporting member 152 screwed to the body 60. The assembly 151 also includes contactor rings 153 attached to the member 152 which are electrically insulated from each other.

Figure 6:
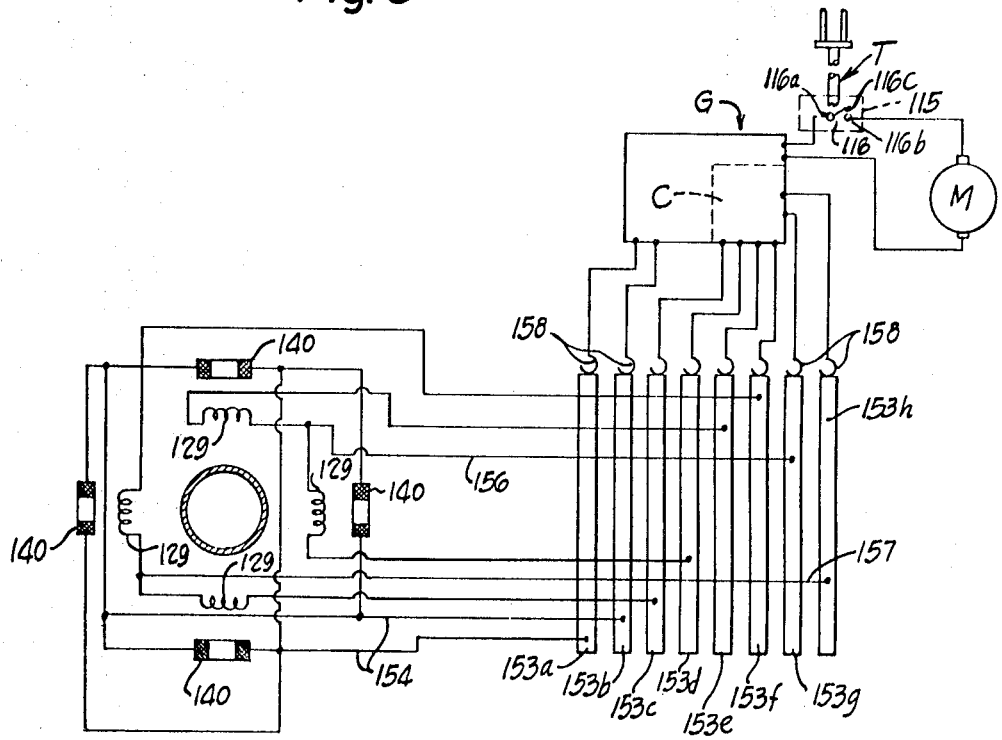
FIG. 6 is a schematic circuit diagram of portions of the apparatus of FIGS. 1–5.

Referring to FIG. 6 the solenoid coils 140 are connected in parallel between contactor rings 153a, 153b by suitable conductors 154. The probe coils 129 are connected to the contactor rings 153c-f, respectively, by suitable conductors 155. The circuits for the probe coils are completed by common connection of one pair of the coils to the contactor rings 153g by a conductor 156, and the other pair to the ring 153h via a conductor 157. The rings 153g, 153h are grounded in the logic unit.

The contactor rings 153 individually engage stationary brushes 158 supported between the bearing supports 55, 56 and the brushes are appropriately electrically connected to the control panel G. Power is therefore supplied to the solenoids and probe coils through the slipring assembly 151 and the noted conductors.

Deenergization of the solenoid coils to actuate the head assemblies 120 to the inspection positions is controlled in response to the position of lengths of pipe relative to the apparatus 10. In order to avoid damage to the units 128, actuation normally occurs during the interval beginning just after the leading end of the pipe has proceeded past the unit A and just prior to the trailing end of the pipe passing through the unit A. As is best illustrated in FIG. 2 the apparatus 10 includes proximity switches 160, 161 which are located at the leading and trailing sides of the inspection unit A, respectively. The proximity switches 160, 161 are preferably of a noncontacting type and thus do not require adjustment to accommodate different sized pipes conveyed through the apparatus. The proximity switches are connected in circuit which controls the energization of the solenoids so that the solenoids 140 cannot be deenergized until the presence of a pipe is detected by both of the switches 160, 161 or the pipe is absent from both of the switches. As the trailing end of the pipe approaches the unit A and passes the proximity switch 160, the solenoids 140 are reenergized to actuate the probe assemblies 120 away from the inspection position thereby avoiding possible damage to the probe units 128 by burrs, etc. at the trailing end of the pipe.

OPERATION OF THE INSPECTION UNIT A

Assuming that pipe of a given diameter is to be conveyed through the apparatus A and that the inspection heads 45 are not positioned to inspect pipe of that size, the first step is to move the inspection assembly to the calibration and maintenance position by operation of the actuator 31. The marker unit B is swung away from the inspection unit A about the hinge. The inspection heads 45 are radially adjusted to accommodate the pipe to be inspected in the manner described. After the inspection heads are adjusted the marker unit B is repositioned and the units A, B are moved back to the inspection position.

The drive motor M is energized to rotatably drive the support assembly for the heads 45 about the path of travel of the pipe. The speed of the motor M is appropriately adjusted in accordance with the size and speed of the pipe to be inspected. Lengths of pipe F are then conveyed through the apparatus.

After the leading end of a pipe section has passed the switches 160, 161, the actuators 121 are conditioned to effect movement of the inspection heads 45 to their inspection positions so that the probe units 128 ride on the periphery of the pipe while orbiting around the pipe.

The probe units 128 trace four, parallel, helical paths along the pipe as the pipe is advanced through the unit A. To afford total inspection of the pipe, these helical paths touch and overlap slightly. When a flaw in the pipe exists the impedance of one or more of the probe coils is altered resulting in an electrical signal to the logic unit C. The logic unit C processes the signal and operates the marker unit B to mark the location of the flaw. As previously noted the logic unit C is described in detail in the copending U.S. Pat. application to Vild.

When the trailing end of the pipe passes the proximity switch 160 the actuators 121 are again operated to move the inspection heads 45 to their retracted positions until the pipe passes proximity switch 161 or until a succeeding pipe length extends between the proximity switches at which time the process is repeated.

THE MARKER UNIT B

Figure 7:
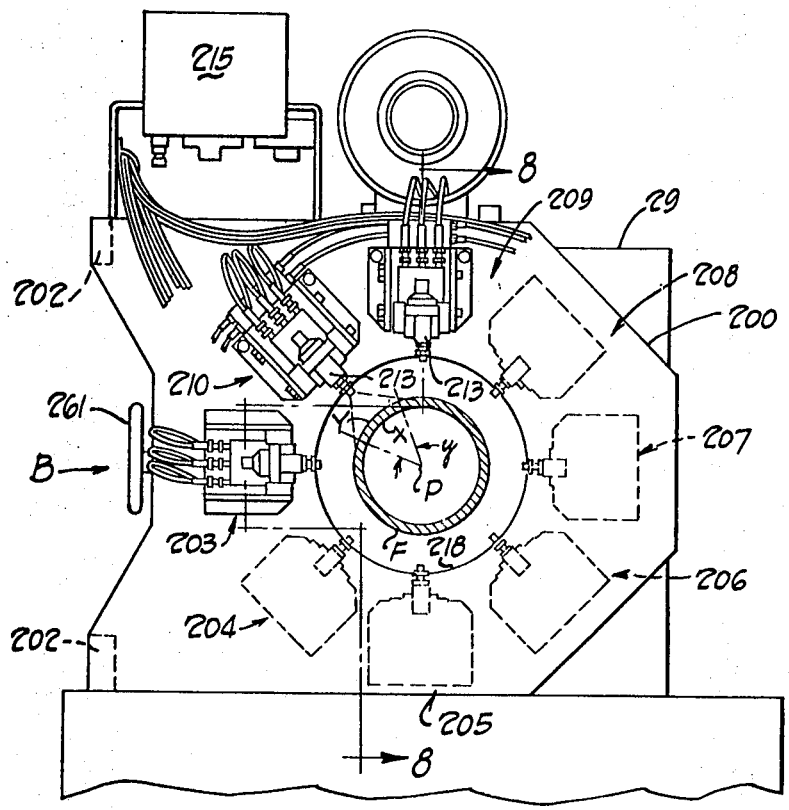
FIG. 7 is an elevational view of a marker unit of the apparatus.

The marker unit B is constructed to clearly mark an area of the pipe surface in which a flaw has been detected. In the preferred construction paint is applied to the pipe over a 45° segment of the pipe surface in which the flaw is located. Referring to FIG. 7, the marker unit B is shown as including a supporting body 200. The body 200 is connected to the housing 29 of the inspection unit A by hinge arms 202. The arms 202 extend between the body and the hinge construction H.

Eight marker assemblies 203–210 are supported by the body 200. Each marker assembly includes a paint spray gun 213, a supply of marking paint in a reservoir 215, a source of atomizing air including a supply line 217, and a pneumatic control system 216 FIG. 7A. The spray guns 213 are regularly spaced about circular opening 218 in the body 200. Each gun is spaced at a 45° angle from the adjacent guns as measured from the axis of the opening 218. The spray guns 213 are identical and commercially available from the Spraying Systems Co. Therefore a single gun is described only generally.

Each gun includes a gun body 220 which is connected to the frame 200 in a manner described presently. The gun body 220 defines a venturi 221 having an axis extending radially of the path of pipe travel. The gun body 220 supports a paint control valve 222. The valve 222 is located between the throat of the venturi 221 and a paint supply line 223, from the reservoir 215. The reservoir 215 is a tanklike structure in which the paint is maintained under a pressure approximately 20 p.s.i.

The atomizing air supply line 217 is connected to the gun 213 for continuously directing air through the venturi 221 at about 10 p.s.i. When the paint control valve 222 opens paint is immediately injected under pressure into the throat of the venturi, atomized, and directed in a conical spray onto the surface of the pipe passing through the opening 218. When the paint control valve 222 closes, paint spraying is abruptly terminated.

Figure 7A:
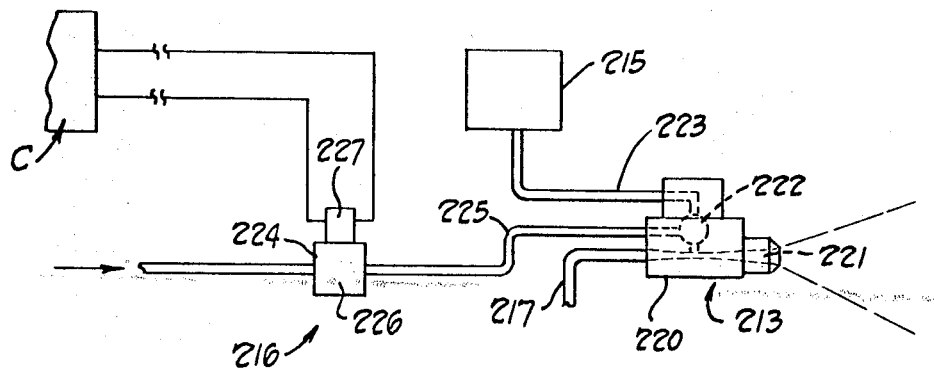
FIG. 7A is a schematic representation of a marker unit and its supply and control system.

Operation of each spray gun 213 is governed by a control system FIG. 7A. The control system for each gun is the same and therefore only a single system is described. The control system 216 includes a solenoid valve assembly 224. The valve assembly 224 is operable, when open, to connect an air line 225 to a source of high-pressure control air. The line 225 is connected to the paint supply valve 222. The valve assembly 224 includes a normally closed air valve 226 which is operated by a normally deenergized solenoid 227. Thus when the solenoid 227 is energized the valve 226 opens to supply control air under pressure through the air line 225 to the valve 222, opening that valve. Deenergization of the solenoid 227 closes the valves 226 and 222 to terminate the paint spray. The solenoid 227 is energized from the logic unit C in response to detection of a flaw by the inspection unit A.

Figure 8:
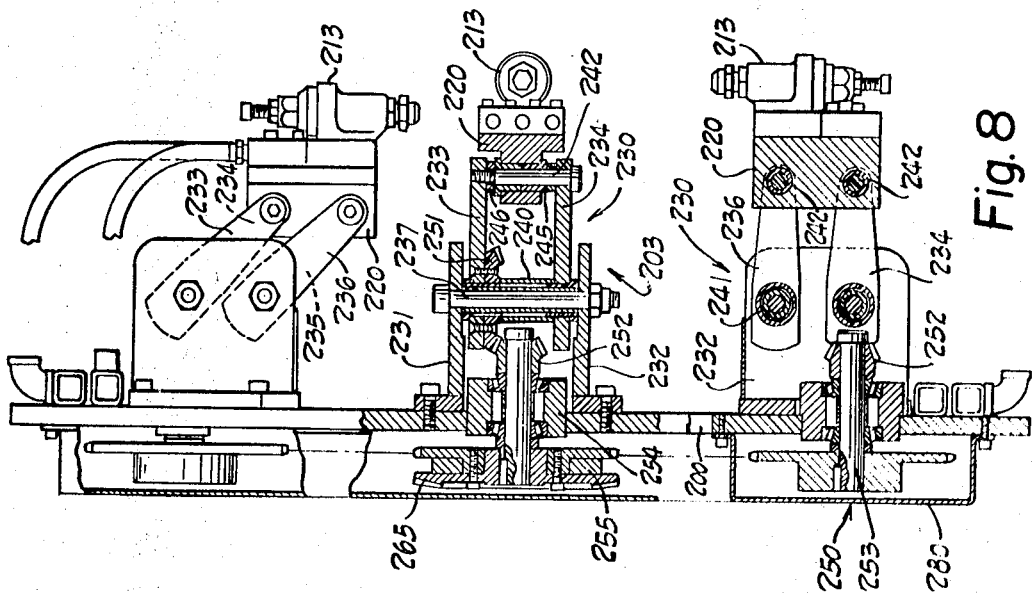
FIG. 8 is a cross-sectional view of a portion of the apparatus of FIG. 7 as seen from the planes indicated by the line 8—8 of FIG. 9.

The spray guns 13 are supported by linkages 230 which provide for radial adjustment of the guns. The linkages 230 supporting the guns are identical and only one such linkage is described, reference being made to FIG. 8. The linkage 230 includes spaced parallel support plates 231, 232 which are screwed to the body 200. The gun body 220 is supported by four support arms 233–236 which extend between the gun body 220 and the support plates 231, 232. The arms 233, 234 are journaled in the plates 231, 232 for rotation about the axis of a pintle 237 extending between the plates. In the preferred constructions the support arms 233, 234 are provided with openings receiving a sleeve bearing construction 240. The bearing 240 surrounds the pintle 237 to insure that the arms move freely. The arms 235, 236 are rotatably supported on a pintle 241 extending between the plates.

The gun body is supported upon the arms 233–236 which provide a parallelogram support linkage for the gun body so that the gun moves radially while maintaining the orientation shown in the drawings. The projecting ends of the arms 233, 234 are secured together by a shouldered bolt pin 242 having a smooth cylindrical body. The head engages one of the arms and a screw-threaded end is received in a threaded opening in the other arm. The smooth body of the bolt 242 is disposed in bushings 245, 246 carried by the body 220 of the spray gun. The support arms 235, 236 are connected to the body 220 at their outer ends by another shouldered bolt 242 in the same manner as set forth with respect to the arms 233, 234. Hence the body 220 is freely rotatable with respect to the arms about the axes of the bolts 242.

A transmission 250 operates the linkage 230 to adjust the radial position of each gun 213. One transmission 250 is associated with each linkage, and one transmission is described in reference to FIG. 8. The transmission 250 shifts the arms 233–236 of the linkage 230 relative to the plates 231, 232 and maintains the arms in the adjusted position. The transmission 250 includes a bevel gear 251 attached to an arm of the linkage. The gear 251 meshes with a bevel pinion gear 252 fixed to a shaft 253. The shaft 253 is journaled in the body 200 by a bearing 254. The shaft 253 extends through the body. A sprocket wheel 255 is carried by the shaft 254 at the side of the body opposite the bevel gear 252. Rotation of the sprocket wheel 255 effects rotation of the bevel gear 251 fixed to the linkage 230 and thereby controls positioning of the gun 213.

Figure 9:
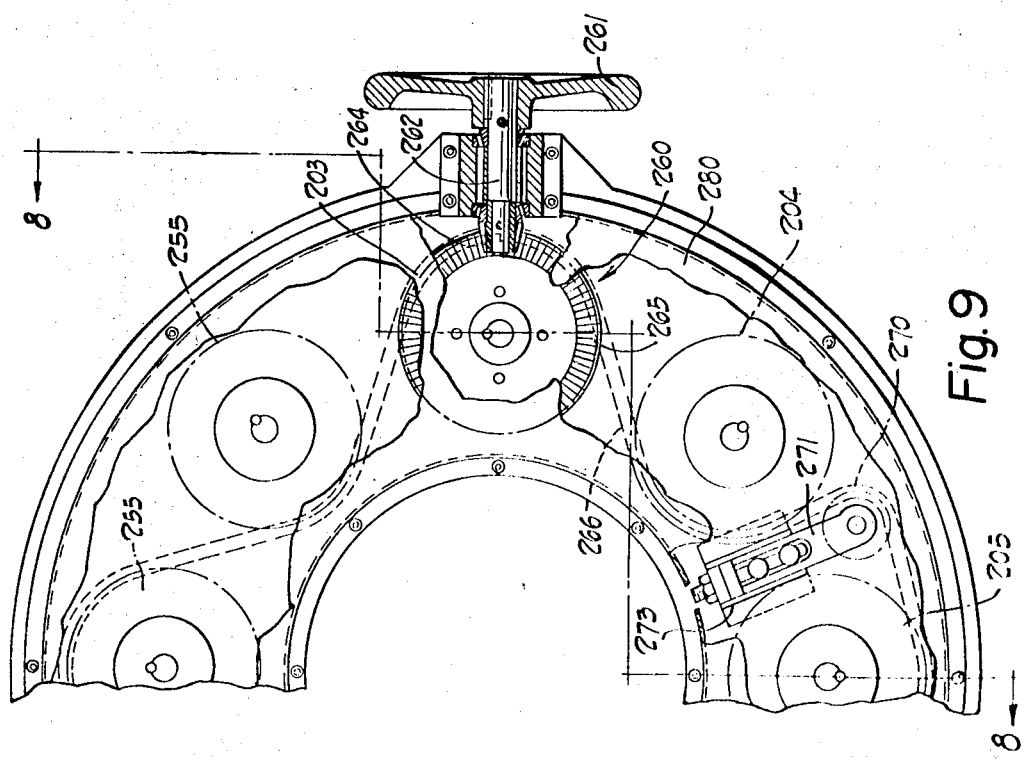
FIG. 9 is a cross-sectional view seen from the plane indicated by the line 9—9 of FIG. 2; and, FIG. 10 is a view similar to FIG. 4 illustrating calibration of the inspection portion.

The guns 213 are simultaneously radially adjusted by a manually operated chain drive 260, FIG. 9, which simultaneously drives the transmissions 250. The chain drive includes a handwheel 261, accessible to the operator of the apparatus. The handwheel 261 is attached to a shaft 262 journaled in the body 200.

The shaft 262 carries a bevel pinion gear 264 which runs in mesh with a bevel gear 265 fixed on the sprocket wheel 255 of the marker assembly 203. A chain 266 is woven about the sprocket wheels 255 of each transmission 250. That is to say: the chain 266 is trained about the outermost periphery of the sprocket wheel 255 of the marker assembly 203, the innermost periphery of the sprocket wheel 255 of the marker assembly 204; the outermost periphery of the sprocket wheel 255 of the marker assembly 205, and so on around the body 200. Hence when the sprocket wheel 255 of the assembly 203 is rotated in a clockwise direction as seen in FIG. 9 the sprocket wheel 255 of the marker assembly 204 is rotated counterclockwise. It has been found that by weaving the chain, sufficient engagement is obtained between the chain 266 and the sprocket wheels 255, that the tension is easily controlled and slack in the movement of individual linkages 230 is minimized.

As seen in FIG. 9 an adjustable chain tensioning idler wheel 270 is connected to the body 200 and engages the chain between the sprockets in the marker assemblies 203, 204. The tensioning idler wheel 270 is supported on an arm 271 which is adjustably attached to the body 201 by a bracket generally designated 273.

Because of the opposite sense of rotational direction of adjacent sprocket wheels 255, the arm of the linkages 230 to which the bevel gear 251 is attached is reversed on adjacent units; that is, the units 203, 205, 207, 209 are constructed with a bevel gear attached to the arm 233; while the units 204, 206, 208, 210 are constructed with the bevel gear 251 attached to the arm 234. In this manner the guns 213 are simultaneously moved radially inwardly when the handwheel 261 is rotated in one direction simultaneously moved radially outwardly when the handwheel is rotated in the opposite direction. The chain drive 260 has sufficient friction to positively maintain the guns in a given adjusted position. The chain drive and sprocket wheels are covered by an suitable cover 280.

As is described in more detail in the above-referenced copending application Ser. No. 789,159 to Vild the solenoid valve assembly 224 of each of the marker assemblies 203–210 is connected to an individual output channel of logic unit C. When a flaw is detected in the pipe F by the inspection unit A the logic unit is provided with information in the form of electrical signals concerning the severity, extent and location of the flaw. For example, as seen in FIG. 7, the pipe F proceeding through the marker unit B contains a flaw X which is located within a 45° segment of the pipe surface denominated Y. The spray gun of the marker unit 210 is located with the included angle y of the segment Y and accordingly the logic unit C operates the marker unit 210 causing the spray gun 213 of that assembly to spray paint within the segment Y. The marker unit C can maintain the gun in the paint spraying condition until the flaw X either passes circumferentially out of the segment Y or terminates. Each of the remaining guns 213 are positioned to spray within a separate 45° segment of the pipe surface when, and if, the logic unit C operates the individual valves 224 of these assemblies.

When the diameter of the pipe F to be inspected is changed, the radial location of the guns 213 in the marker assemblies must also be changed in order to insure that each gun is positioned for spraying a suitable size mark within the 45° segment of the pipe surface. Thus when the inspection unit A is adjusted in the manner set forth above the marker unit B is also adjusted by operation of the handwheel 261 so that the spray guns are properly positioned radially with respect to the surface of the pipe. Suitable indicia can be provided on the marker unit B for indicating proper positioning of the guns 213 for any given pipe size.

CALIBRATION OF THE INSPECTION UNIT

From time to time during operation of the apparatus 10 it is desirable to calibrate the flaw detecting heads 45 to insure that flaws of a substantial nature are being detected. Accordingly the apparatus 10 is provided with novel calibration structure 300. The structure 300 includes a section of calibrating pipe 301, permitting frequent and simple calibration of the heads to be accomplished in a minimal time.

Figure 10:
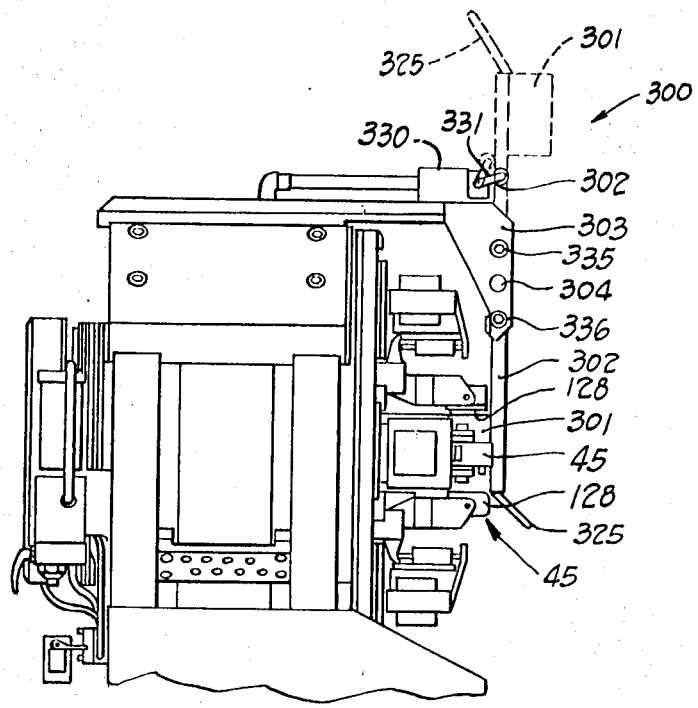

As seen in FIGS. 4 and 10 the calibrating pipe 301 is carried by an arm 302. The arm 302 is connected to a depending flange 303 at the end of the housing 29 adjacent the heads 45. The arm 302 is connected to the flange 303 by a hinge 304 so that the arm is rotatable from the solid line position illustrated in FIG. 4 to a calibration position illustrated in solid lines in FIG. 10.

The calibrating pipe 301 is provided with a series of flaw serrations of a known severity. When the heads 45 orbit about the calibrating pipe the actual signals produced by each probe coil unit 128 can be compared to ideal signals produced by the simulated flaws in the calibrating pipe, and the detection or logic circuitry can then be calibrated.

While only a single section of calibrating pipe is shown, in practice several of such sections, each having a different diameter, are used so that the inspection heads can be calibrated after radial adjustment of the heads for a given pipe size. These sections of calibrating pipe can be removed and replaced in the apparatus.

The calibrating pipe 301 is detachably connected to the arm 302 by an annular support member 306, fixed to the calibrating pipe, and a clamp 307. The clamp 307 includes a cylindrical hub 310 which is fixed to the arm and on which the member 306 is supported. The hub carries a stud 312 having a threaded end projecting through the member 306. An annular pressure plate 313 is slidably supported on the stud and is urged into engagement with the support member 306 by a threaded follower 314. The pressure plate includes an annular bearing surface 315 engageable with the support member 306 about the stud 312 to compress the support member against a shoulder 316 on the hub 310. The pressure plate also includes a key projection 320 which extends into aligned key slots in the hub and the support member. The key 320 insures proper alignment of the pipe section 301 with the heads 45, and additionally insures that the calibrating pipe 301 is not rotated on its support as the heads orbit about it.

Calibration of the inspection unit A is accomplished as follows. First the inspection assembly is indexed to the calibration and maintenance position by operation of the actuator 31. The marker unit B is then swung away from the inspection unit A about the hinge H to expose the inspection heads. A calibrating pipe section 301 corresponding to the diametrical size of pipe currently being inspected by the apparatus is clamped onto the arm 302. The arm 302 is rotated about its hinge 304 into its calibration position between the heads 45, by the use of a handgrip 325.

The motor M is then operated to orbit the heads about the calibrating pipe section and the heads 45 are individually calibrated. The preferred embodiment of the present invention includes a recorder unit integral with the control panel G for use in calibrating the heads 45. One such recorder which has been used in connection with the apparatus 10 is a Brush, Mark II recorder (Rd–2521–20). This recorder is a two channel device which produces a paper strip chart of the signals produced by individual probe coils in the inspection unit. The recorder is suitably connected in circuit with individual coils and the signals from each head are successively recorded and compared with ideal responses to the flaws in the calibrating pipe section.

When the calibrating pipe section 301 is in the calibrating position the marker unit B and logic unit C are disabled so that only the drive motor M for the inspection unit A and the solenoids 140 are energizable from the control panel. This prevents spraying of paint etc. by the marker unit as the heads 45 are being calibrated. To this end the limit switch 330 is positioned on top of the housing 29 adjacent the arm 302. The limit switch 330 includes a switch arm 331 which is biased against the arm 302 so that when the arm is in its upright position the limit switch 330 is conditioned to permit normal operation of the inspection and marker units A, B respectively. When calibrating pipe section 301 and arm 302 are moved to the calibrating position as described the switch arm 331 is released and actuates the limit switch 331 to disable the logic units C and marker unit B.

In addition to the noted functions, the limit switch 330 additionally prevents the units A, B from being moved into the inspection position so long as the calibrating pipe section is in its calibration position. To this end the limit switch 330 includes switch contacts which are associated with the control circuitry for the valve V. This prevents actuation of the valve V to cause the actuator 31 to move the inspection assembly to the inspection position so long as the arm 302 of the calibration structure is away from its upright position.

In the preferred embodiment of the invention the arm 302 can be fixedly maintained in its upright and calibration positions, respectively. As best seen in FIG. 10 the depending flange 303 carries movable pins 335, 336 both of which are removed prior to moving the calibration pipe section 301 between its noted positions. The pin 336 extends through openings in the depending flange and the arm 302. When the arm 302 is moved to the calibrating position the pin 336 is removed, and the arm 203 and calibrating pipe section 301 are moved into the calibrating position. The pin 335 is reinserted through holes in the flange 303 and the arm 302 to lock the arm in place.

Although a preferred embodiment of the invention has been described with a certain degree of particularity, it is understood that the present disclosure of the preferred form has been made only by way of example, to illustrate that the foregoing objects, and others, have been accomplished.

We claim:

1. Apparatus for detecting defects in cylindrical articles comprising:
   a. conveying means for advancing cylindrical articles through a path of travel;
   b. a frame supported along said path;
   c. a rotatable body mounted on said frame for rotation about an axis;
   d. a plurality of inspection heads connected to said body for rotation therewith about said axis;
   e. said heads each comprising a probe assembly having a flaw detecting probe unit and probe unit support structure connecting said unit to said body for movement between an inspection position wherein said unit is at least closely adjacent said path whereby it is adjacent a surface of an advancing article and a retracted position remote from said path;
   f. an actuator for effecting movement of said unit between said positions;
   g. head support structure connecting said heads to said body including at least one cam member movable relative to said body to adjust the location of said assembly radially relative to said axis;
   h. said cam member defining at least a cam surface and supporting each assembly at radial locations on said body; and i. said support structure further including a guide member for said assembly having at least one surface for constraining movement of said assembly along a predetermined path as said cam member moves.

2. Apparatus as defined in claim 1 and further including a bushing between said cam member and said guide member for permitting movement of one of said members relative to said body and said other member.

3. Apparatus as defined in claim 1 wherein said cam member and said guide member have central openings through which said axis of rotation extends, said assemblies attached to a slide connected to one of said members and which includes a projecting portion engaging said guide surface and said cam surface.

4. Apparatus as defined in claim 3 wherein said cam surface is defined by a slot in said cam member and said guide surface is defined by a generally radially extending slot in said guide member having a longitudinal axis which is transverse to the longitudinal axis of the cam slot.

5. Apparatus as defined in claim 3 and further including locking structure detachably connecting said guide member and said cam member together against relative rotation therebetween, said locking structure comprising a movable lock member supported by one of said guide and cam members and engageable with the other of said members to lock said members against relative rotation.

6. Apparatus as defined in claim 5 and wherein said other member defines a series of holes for individually receiving said locking member to lock said members against relative rotation in one of a series of relative positions.

7. Apparatus for detecting defects in cylindrical articles advancing along a path of travel comprising:
   a. a frame supported along said path;
   b. a rotatable body mounted on said frame for rotation about an axis;
   c. a plurality of inspection heads connected to said body for rotation therewith about said axis to orbitally move about an article advancing along a path of travel;
   d. said inspection heads each including:
      1. a flaw detecting probe unit;
      2. a probe unit support between said probe unit and said body;
      3. actuator means connected between said probe unit and said probe unit support for moving said probe unit relative to said probe unit support between an inspection position wherein part of said probe unit is at least closely adjacent an advancing article and a retracted position spaced radially outwardly from said inspection position; and,
   e. second actuator means for moving said inspection heads radially relative to said body for adjusting the locations of said inspection heads to accommodate different sized articles.

8. Apparatus as defined in claim 7 wherein each of said flaw detecting probe units have leading and trailing portions in the direction of workpiece travel and further including spring means for urging the trailing portion of the probe unit toward the path of travel, said trailing portion of said probe unit being moved against said biasing means when a leading end of an article engages the trailing portion.

9. Apparatus as defined in claim 7 and further including a third actuator for shifting said apparatus horizontally away from said path of travel, said third actuator including a member having a first position in which said path of travel extends through said body for inspection of articles, and a second position in which said apparatus is clear of a path of travel permitting calibration and maintenance thereof.

10. Apparatus as defined in claim 7 and further including jack assemblies for vertically moving said body to accommodate elevational changes in paths of travel of articles.

11. Apparatus as defined in claim 7 wherein said heads are orbited about said axis to trace helical paths with respect to articles advancing along said path of travel, said helical paths abutting or overlapping each other so that substantially the entire outer surface of the article is inspected.

12. Apparatus as defined in claim 7 wherein said heads each produce an electrical signal when moved adjacent a flaw in an article and are connected to signal processing circuitry through an electrical circuit including a slipring assembly supported in part by said body.

13. Apparatus as defined in claim 12 wherein said first actuators are electrically energized to control movement of said probe units between said positions, said first actuators energized and deenergized by completion and interruption of circuits through said slipring assembly.

14. Apparatus as defined in claim 7 wherein said first actuators each include a connecting rod structure engaging a surface on a respective probe unit, said rod moving to effect movement of said probe unit relative to said probe unit support from one of said positions to said other position.

15. Apparatus as defined in claim 14 and further including spring structure for urging said probe unit against said rod, said spring structure normally maintaining said probe unit in said inspection position.

16. Apparatus as defined in claim 15 wherein said first actuator comprises a solenoid coil having an armature connected to said rod, said solenoid operable between a deenergized condition in which said spring structure urges said probe unit to the inspection position and an energized condition wherein said armature and said rod move to overcome the force of said spring structure and maintain said probe unit in the retracted position.

17. Apparatus as claimed in claim 7 and further including structure for calibrating said inspection heads, said calibration structure comprising a first member defining a simulated article having defects of known severity therein, and a second member supporting said first member for movement relative to said frame between a calibration position in which a periphery of said first member is adjacent said heads for inspection and a second position remote from said heads.

18. Apparatus as claimed in claim 17 wherein said second member is rotatably connected to said frame and said first member is detachably connected to said second member.

19. In an apparatus for detecting flaws in cylindrical articles:
   a. a plurality of flaw detecting assemblies orbitally moved about a rotation axis and adjacent a periphery of a cylindrical article for detecting flaws therein;
   b. structure supporting said assemblies for rotation about said axis and for radial movement toward and away from said axis, said structure comprising;
   c. a first annular guide plate defining guide surfaces engageable with each assembly;
   d. a second annular cam plate defining cam surfaces engageable with each assembly;
   e. and means enabling relative movement between said plates; and
   f. said cam and guide surfaces urging said assemblies in a radial direction relative to said axis upon relative movement therebetween.

20. In an apparatus as claimed in claim 19 wherein said means includes locking structure for preventing relative rotation between said plates when said assemblies are at a predetermined location radially of said axis.

21. Apparatus for detecting defects in cylindrical articles comprising:
   a. conveying means for advancing cylindrical workpieces through a path of travel;
   b. a frame supported along said path;
   c. a rotatable body mounted on said frame for rotation about an axis;
   d. a plurality of inspection heads connected to said body for rotation therewith about said axis;
   e. said heads each including a probe assembly having a flaw detecting probe unit and probe unit support structure connecting said unit to said body for movement between an inspection position wherein said unit is at least closely adjacent said path whereby it is adjacent a surface of an advancing workpiece and a retracted position remote from said path;
f. an actuator for effecting movement of said unit between said positions;
g. head support structure connecting said heads to said body including at least one support member movable relative to said body to adjust the location of said assembly radially relative to said axis;
h. an electric motor for rotating said body, said motor energized through a circuit connected across electric power supply terminals, and means for completing said circuit through said motor including a tool and a tool support structure, said circuit completed when said tool is supported by said tool support structure and interrupted when said tool is removed; and,
i. said tool including parts engageable with said at least one support member for adjusting the location of said assembly when said tool is removed from said tool support structure.

22. In an apparatus for detecting flaws in articles advancing along a path of travel comprising at least one flaw detecting head supported for orbital movement about articles:
a. calibrating structure for said at least one head;
b. said calibrating structure comprising a first member defining a simulated article having flaws of known severity therein;
c. a second member supporting said simulated article for movement relative to said at least one head from a first position remote from said head to a second calibrating position wherein said simulated article lies on said path of travel and the periphery of said simulated article is located for inspection by said head;
d. said at least one flaw detecting head being supported in an inspection unit and further including a marker unit having a marking device for marking articles in response to detection of flaws;
e. switch means operated in response to movement of said second member from said first position to disable said marker unit;
f. an actuator for moving said inspection and marker units between an inspection position in which articles are advanced therethrough along the path of travel and a second calibrating position wherein said units are cleared from said path; and
g. said switch means disabling said actuator from moving said units from the calibrating position when said second member is away from said first position.

23. Apparatus for detecting flaws in articles advancing along a path of travel comprising:
a. a support frame;
b. a body supported on said frame for rotation about a rotation axis coextending with an article path of travel;
c. a plurality of flaw detecting heads supported on said body at an end thereof for rotation therewith about said axis whereby an article advancing along the path passes through said body between said heads; and,
d. calibration structure for said apparatus comprising:
  1. a generally cylindrical calibration article having flaws of known severity;
  2. a support member for said calibration article, including structure for detachably supporting a calibration article with its axis at a predetermined location on said support member;
  3. a hinge connecting said support member to said support frame for rotation about a hinge axis between a first position wherein said calibration article is remote from said path of travel and a second calibration position wherein said calibration article is substantially on said rotation axis and said calibration article is positioned for inspection by said heads; and,
  4. said calibration article axis rotating in a plane with said rotation axis between said positions and said hinge axis extending transverse to said plane.